United States Patent [19]

Yang

[11] Patent Number: 5,110,607
[45] Date of Patent: May 5, 1992

[54] CHEWING GUM COMPOSITION AND METHOD OF MAKING SAME

[75] Inventor: Robert K. Yang, Randolph, N.J.

[73] Assignee: Warner-Lambert Company, Morris Plains, N.J.

[21] Appl. No.: 424,984

[22] Filed: Oct. 23, 1989

Related U.S. Application Data

[63] Continuation-in-part of Ser. No. 865,509, May 20, 1986, Pat. No. 4,876,095.

[51] Int. Cl.$^5$ .............................................. A23G 3/30
[52] U.S. Cl. ............................................ 426/3; 426/6
[58] Field of Search ......................................... 426/3-6

[56] References Cited

U.S. PATENT DOCUMENTS

| | | | |
|---|---|---|---|
| 2,137,746 | 11/1938 | Wilson | 426/3 |
| 2,284,804 | 6/1942 | De Angelis | 426/3 |
| 3,984,574 | 10/1976 | Comollo | 426/4 |
| 4,452,820 | 6/1984 | D'Amelia et al. | 426/3 |
| 4,525,363 | 6/1985 | D'Amelia et al. | 426/3 |

FOREIGN PATENT DOCUMENTS 49-20510  5/1974  Japan.

*Primary Examiner*—Jeanette Hunter
*Attorney, Agent, or Firm*—Daniel A. Scola, Jr.

[57] ABSTRACT

The present invention is a chewing gum base composition which includes an elastomer and a resin prepared in the absence of rosin esters and terpene components which includes an elastomer component raised to a compatibilization temperature for addition of a compatibilization component. The composition includes a high melting point wax compatibilization component added under low shear mixing conditions at a temperature sufficient to masticate the elastomer for forming a substantially homogeneous mass with the resin component. The compatibilization component is capable of effectuating dissociation of the elastomer under the conditions of temperature and mixing for forming the substantially homogeneous mass. Finally, a resin component is added also under low shear mixing conditions and mildly elevated temperatures until a substantially homogenous gum base mass is formed.

23 Claims, No Drawings

CHEWING GUM COMPOSITION AND METHOD OF MAKING SAME

This application is a continuation-in-part of Ser. No. 865,509 filed May 20, 1986 which is now U.S. Pat. No. 4,876,095.

BACKGROUND OF THE INVENTION

The present invention relates to the art of chewing gum base compositions, and, in particular, to gum base compositions which include an elastomer and a resin component prepared without the need for certain undesirable components.

Chewing gums available today generally contain a water-insoluble or base portion and a water-soluble flavor portion which is dissipated over a period of time during mastication of the gum in the oral cavity. The base portion can include a natural or a synthetic elastomer, and, optionally, a resin component and a texturizing component for achieving a particular perceived effect by the consumer.

The present invention is particularly concerned with those gum base compositions in which there are both an elastomeric portion as well as a resin component which can be made to be compatible in combination without the need for certain undesirable ingredients heretofore generally considered necessary.

The elastomer component can, in accordance with the present state of the art, include synthetic elastomers, natural elastomers, or combinations thereof. This element generally provides the insoluble cud with resiliency to recover from deformation caused during chewing. The resin component, which is also a polymeric material, provides the insoluble cud portion of the gum with other desirable characteristics such as film forming capabilities, and inherent strength for unbroken deformation under chewing forces, i.e., "lay-flat" quality, etc.

In order for the overall cud containing both an elastomeric portion and a resin component to retain the desired characteristics of the combination, the inherent cohesivity of each of the individual components must be overcome or dissociated to some extent in order to open up the structure sufficiently to be compatible for mixing. Only when the two components are "opened up" sufficiently to be miscible to some extent with each other, can a satisfactory base portion be provided for addition of desired texturizing agents and eventually chewing gum composition ingredients, e.g., sugar, flavoring, etc.

Thus, in order to prepare a high-grade gum base, it is necessary to effect compatibilization of an elastomer and the resin component when the two are used in combination. In the case of high molecular weight resins, this can be a particularly difficult problem, in view of the intensity of the inherent strength of the inter-molecular attractive forces or inter-molecular interaction.

In the past, it has been generally considered necessary to include rosin esters, hydrogenated rosin esters, polymerized rosin esters and unhomogenized rosin esters, and terpene resins to compatibilize the elastomeric component with the resin component especially high molecular weight resin such as high molecular weight polyvinylacetate, e.g., having a molecular weight of greater than about 20,000.

Although the use of these esters and ester derivatives, help to compatibilize otherwise generally immiscible gum components, there are several drawbacks which would encourage one to refrain from using such ester gums. In particular, ester gums have unpleasant taste and odor and are characteristically rigid, very hard, brittle, nonchewable, and require significant amount of energy as well as the addition of extensive amounts of softeners, fillers, etc., in order to achieve proper texturization. Thus, even though the gum can be pliable and elastic at the beginning of the chewing or mastication period, it can quickly become excessively pliable and sticky in the mouth, lose its elasticity, and develop an unpleasant chewing sensation. Furthermore, cracks can develop in the gum during storage which can cause shedding.

Similarly, elastomer solvents used to compatibilize elastomer components with resins have included terpene resins such as polymers of beta pinene, and beta-pinene. Other problems are incurred by use of the terpene solvents, similar to those problems incurred by use of rosin esters and derivatives thereof.

Efforts in the past to eliminate the need for wood rosin esters and terpenes, have included polymerizing the monomer unit of a resin such as vinyl acetate and/or vinyl propionate in the presence of a hydrogenated petroleum resin alone or in mixture with a hydrogenated petroleum resin with known chewing gum base additives and/or known natural resins for chewing gum bases. This is disclosed in Japanese Patent Public Disclosure No. 49-205,10 (1974). Other efforts have included the use of comparatively expensive compatibilization components such as glycerol triacetate, and acetylated monoglyceride, combinations thereof, etc. For example, U.S. Pat. No. 4,452,820 to D'Amelia, et al. discloses a single phase formulated homogeneous gum base which contains a plasticized elastomer and a plasticized resin in the absence of ester gum. In the case of the D'Amelia, et al. '820 disclosure, a styrene butadiene elastomer is plasticized with a plasticizer selected from one of butyl stearate, butyl oleate, glycerol trioleate, oleic acid, or mixtures thereof, while the resin component is plasticized with a plasticizer selected from the group consisting of glycerol triacetate, glycerol tributyrate, triethyl citrate, acetylated monoglyceride, etc. and combinations thereof. In the case of the process disclosed in the Japanese reference, it is required to copolymerize the components, and in the case of the D'Amelia '820 disclosure, it is necessary to provide a plasticizer for each of the components, one of which is a rather expensive plasticization component.

U.S. Pat. No. 4,525,363 to D'Amelia, et al. discloses a variety of polymers which plasticize both the resin and the elastomer components. The polymers are of the polymeric resin type materials and include, for example, acrylates, acetates, butylenes and silicones. The elastomer may be a styrene butadiene whereas the resin may be a polyvinyl acetate. The D'Amelia, et al. '363 reference also discloses the optional inclusion of waxes having a relatively low melting point which may be present in an amount of from about 0% to about 18% so as to reduce the tackiness of the final gum composition.

U.S. Pat. No. 2,284,804 to De Angelis discloses polybutene chewing gum base compositions which include the use of "substantial quantities of wax at least equal to the amount of polybutene present." (Col. 2, Lines 28–30). The resin component of the base disclosed, however, is indiscriminately chosen from hydrogenated synthetic and hydrogenated natural resins and ester gums. (Col. 2, Lines 42–45.).

The use of waxes in a gum base has also been contemplated. U.S. Pat. No. 2,137,746 to Wilson discloses chewing gum bases which include small proportions of paraffin waxes having melting points in the range of about 160° F. to about 185° F. in combination with natural elastomers or in combination with latex elastomers and ester gums so as to improve the smoothness of the gum formulations while retaining the other desirable properties of the springiness and roundness of the cud. The Wilson disclosure, however, fails to suggest a gum base having compatibilized synthetic elastomers.

Similarly, in U.S. Pat. No. 3,984,574 to Comollo an attempt has been made to reduce the need for rosin derivatives, with polyvinyl acetate and polyterpenes in order to reduce the tackiness associated with such bases. In order to do so, Comollo requires the use of polyisobutylene in combination with polyvinyl acetate and hydrogenated or partially hydrogenated vegetable oils or fats in an amount of 5–50%, and filler in an amount of 5–40% in order to allegedly achieve an adhesive or non-tacky base. The Comollo '574 disclosure requires the use of vegetable oils and fats and mineral adjuvants as fillers to achieve the desired result. Thus, it is an object of the present invention to provide a gum base composition which includes both an elastomer and a resin in the absence of rosin esters.

It is a further object to provide a gum base as described above which does not require the use of terpene softeners.

A further object of the present invention is to provide a gum base without the need for ester and terpene softeners by use of a inexpensive compatibilization component.

Yet a further object of the present invention is to provide a gum base in which a chewing gum composition can be prepared in a continuous process without the requirement for aging, cooling, etc.

Other objects will become apparent to the skilled practitioner in view of the disclosure as set forth below.

SUMMARY OF THE INVENTION

The present invention is a chewing gum base composition having an elastomer component and a resin component which can be prepared in the absence of rosin esters and terpenes. The present chewing gum base composition includes an elastomer component raised to a compatibilization temperature for addition of a compatibilization component. It further includes a high melting point compatibilization component, preferably a high melting point wax which can be added under low shear mixing conditions at a temperature sufficient to masticate the elastomer for forming a substantially homogeneous mass with the resin component. The compatibilization component is capable of effecting dissociation of the elastomer under these conditions of temperature mixing for forming the substantially homogeneous mass. Finally, a resin component is added under low shear mixing conditions and at mildly elevated temperatures until a substantially homogeneous gum base mass is formed.

Optionally, the gum base composition of the present invention can include a texturizing component having ingredients selected from the group consisting of softeners, fillers, emulsifiers, and combinations thereof.

Elastomers can be those which are normally used in gum bases. For example, the elastomer component can be selected from the group consisting of styrene-butadiene copolymer, polyisobutylene, polyisoprene, isobutylene-isoprene copolymer and natural elastomers. Other elastomers compatible for use as a gum base component are included herein.

In one preferred embodiment, the gum base composition can include a first solid elastomer component and a cold flow elastomer component after said solid elastomer component has been masticated by use of said high melting point compatibilization component.

Preferably the high melting point compatibilization component is a high melting point wax wherein the melting point is from about 130° to about 250° F., preferably from 160° to 215° F., and most preferably between 175° and 195° F. Such waxes can include microcrystalline wax and paraffin wax.

The resin component of the gum composition of the present invention is preferably a high molecular weight resin selected from the group consisting of polyvinyl acetate, polyvinyl butylester, copolymers of vinylesters and vinylethers, polyethylene, ethylene-vinylacetate copolymers, vinylacetate, vinylalcohol copolymers, vinylacetate-vinyl-laurate copolymers, and combinations thereof. By high molecular weight it is meant that the resin have at least about 20,000 MWU.

With regard to the texturizing component, softeners can be selected from the group consisting of hydrogenated vegetable or animal fats, glycerol monostearate, lecithin, coconut oil, palm oil, fatty acids, glycerol triacetate, and acetylated monoglyceride and combinations thereof. Furthermore with regard to the texturizing agent, there can be included a filler component selected from the group consisting of calcium carbonate, aluminum hydroxide, alumina, magnesium carbonate, dicalcium phosphate, talc, magnesium trisilicate, magnesium hydroxide, alumina silicates, silica gel, organic fillers, and combinations thereof.

Preferably, the gum base composition includes elastomer component in an amount of from about 5% to 20% by weight of said base, and, more preferably from about 7% to about 15% by weight; whereas the resin component is included in an amount of from about 10% to about 50% by weight based on the gum base, and is preferably included in an amount of from about 25% to about 40% by weight. The high melting point compatibilization component, e.g., high melting point wax is included in an amount of from about 15% to about 55% by weight of the base, and is preferably from about 28% to about 45% by weight. Finally, the texturizing component is included in an amount of from about 10% to about 35% of the base, and is preferably included in an amount of from about 12% to about 24% by weight.

The present invention also includes the method of preparing a gum base composition by heating the elastomer component to a temperature of from about 220° C. to about 250° C. followed by step-wise addition of the compatibilization component, such as high melting point wax in, for example, four increments followed by 10 minutes of mild mixing.

In a most preferred embodiment, it has been known to use a cold flow elastomer component as an additional compatibilization component such elastomer defined as not being a solid at room temperature.

Finally, the present invention also contemplates chewing gum compositions which includes a gum base composition prepared in accordance with the formula and in accordance with the method set forth therein.

As a result of the present invention a high quality gum base can be prepared for use in nearly all types of gum compositions without the need for inclusion of wood rosin esters and derivatives thereof including terpene components. Thus, as a consequence, characteristics and features of such ester components which detract from the quality of a chewing gum base and composition made therefrom are eliminated.

It is also possible as result of the present invention to continue to prepare a chewing gum composition continuously from the preparation of the chewing gum base by continued mixing without the requirement of intermittent cooling, aging or otherwise interrupting the chewing gum making process.

For a better understanding of the present invention, together with other and further objects, reference is made to the following description, and its scope will be pointed out in the appended claims.

DETAILED DESCRIPTION OF THE INVENTION

In the preferred embodiments of the present invention, it has been found that a gum base can contain any of the preferred elastomer components in combination with a resin component to form a single phase homogeneous base with or without a texturizing component to render a base with good organoleptic properties.

In particular, the elastomer component of the gum base of the present invention can be selected from the synthetic elastomers styrene-butadiene copolymer, polyisobutylene, isobutylene-isoprene copolymer (butyl rubber), natural rubber (polyisoprene), as well as masticatory substances of natural origin, such as rubber latex solids, chicle, crown gum, nisparo, rosidinha, jelutong, pendare, perillo, niger gutta, tunu, etc.

The resin component, on the other hand, can be selected from polyvinyl butyl ester, copolymers of vinyl esters and vinyl ethers, polyethylene, ethylene-vinyl acetate copolymers, vinyl acetate-vinyl alcohol copolymers, vinyl acetate vinyl laurate copolymers, and in particular high molecular weight polyvinyl acetate, which is at least about 20,000 MWU.

Since both the elastomers and the polymeric resins have an inherently strong intermolecular interaction, sometimes referred to as cohesive energy-density, which must be overcome to some extent in order to achieve compatibility, the elastomer is first treated to be opened up sufficiently to effect miscibility with the selected resin. Accordingly, it has been found that the elastomer, such as polybutyl rubber can be heated to a temperature for opening up the intermolecular structure under conditions of low shear mixing, such as with a sigma blade at low revolutions, after which a high melting point compatibilization component can be added.

As mentioned before, the preferred high melting point compatibilization components include high melting waxes such as microcrystalline wax, paraffin, etc.

The compatibilizing wax should be added in increments in a step wise addition process, after the elastomer has been reduced to a fine particulate consistency, such as a sandy consistency. Interestingly, it has been found that liquid wax used in a compatibilization role at these temperatures and conditions do not properly affect the conditioning of the elastomer in order to effect miscibility with the resin component.

Thus, in one embodiment the wax component which is included in an amount of from about 15% to about 55% based on the weight of the gum base, can be added in increments of 25% of the overall weight of the wax and subjected to the above-described mixing conditions for periods, of, for example, 10 minutes each.

In the most preferred embodiment, it has been found that a non-solid elastomer, such as an oligomeric butyl rubber component can be included as one of the stepwise additions of the wax component, to achieve an optimum elastomeric component suitable for forming into a homogeneous gum base with a resin, especially a high molecular weight resin. While the reason for the increased efficiency of mixing using the oligomeric elastomer is not entirely certain, it is believed that the principle of like components dissolve like components comes into play, and that the non-solid oligomeric component enters into the intermolecular structure to increase miscibility therewith. One particularly effective combination has been found to be a solid polybutyl rubber elastomer in combination with oligomeric butyl rubber cold flow material, e.g., Vistanex (LMMH) tradename of Exxon Corporation.

In the event that the additional oligomeric elastomer is added, the remainder of the wax should be added in the increments of about 25% of the total wax, each addition under continued mixing and temperature. It has been found that a particularly effective compatibilization component is a microcrystalline wax having a melting point of about 195° F.

Once the elastomer component in combination with the compatibilization component has reached a highly viscous, substantially single phase homogeneous mass, the resin component can be added, also preferably in step-wise increments under continued conditions of low shear mixing and elevated temperatures. In particular it has been found that high molecular weight polyvinyl acetate in an amount of about 30 to 45% of the overall weight of the gum base can be added to the masticated elastomer in increments of about ⅓ each step and blended for about five minutes during each addition.

As a result of this unique combination and method of mixing, the elastomeric and resin component come together to form a miscible single phase homogeneous plastic mass to which a texturizing component can be easily incorporated without undue processing effort. It is important to note that the initial processing steps have been conducted at a temperature maintained between 220° to about 250° C., at which point most of the heretofore known plasticizers would vaporize and boil off. This is especially true since under the mixing conditions, the temperature of the working plastic mass can easily attain a temperature of about 270° C. Thus, it is important to use very high boiling point waxes in order to prevent loss of the compatibilization component during mixing.

At this point, a texturizing component can optionally be added which usually includes materials such as fillers, softeners, emulsifiers, anti-oxidants, etc. Examples of fillers suitable for use include calcium carbonate, aluminum hydroxide, alumina, magnesium carbonate, dicalcium phosphate, talc ($3MgO.4SiO_2.H_2O$), magnesium trisilicate, magnesium hydroxide, aluminum silicates, silica gel, organic fillers and combinations thereof, calcium carbonate being one of the preferred fillers. In the event that acid flavors and/or acid sweeteners, such as a free acid form of saccharin, acid cyclomate or aspartame are employed in a final chewing gum composition, it is preferred to employ a non-chalk filler such as talc.

Other softening agents which can be included over texturizing component are glycerol triacetate acetylated monoglyceride, benzyl benzoate, benzyl butyrate, etc., with gylceryl triacetate being a preferred softener.

Other components include the use of hydrogenated or partially hydrogenated vegetable oils or animal fats such as soybean, cottonseed, corn, peanut, palm oil, tall oil, and lard.

Additionally, emulsifiers and anti-oxidants, such as butyl hydroxyanisol can be added as required.

WORKING EXAMPLES OF THE INVENTION

Actual samples of the present invention have been prepared utilizing a general composition formula as shown below in Table I.

TABLE I

GENERAL FORMULA FOR GUM BASE WITHOUT ROSIN ESTERS

| Gum Base Ingredients | % By Weight of Gum Base |
| --- | --- |
| Elastomer Component | 7% to 15% |
| solid elastomeric component | 5% to 15% |
| non-solid elastomer component | 0% to 10% |
| Compatibilization Component | 28% to 45% |
| Resin Component | 25% to 50% |
| Optional Texturizing Component | 0% to 45% |

In order to effect proper formation of a homogeneous substantially single phase gum base, it is important that the solid elastomeric component be heated to a compatibilization temperature before the compatibilization component, which must be one that will not volatilize at such high temperature, can be added and worked with the elastomer.

In particular, it has been found that in the case of the more specific formulation shown in Table II below, the elastomeric component should be heated to a temperature of from about 220° C. to about 250° C., before step-wise addition of a compatibilization component is commenced.

TABLE II

GENERAL FORMULATION FOR A SPECIFIC BASE COMPOSITION

| Gum Base Ingredient | % By Weight Of Gum Base |
| --- | --- |
| Elastomer Component | 4% to 10% |
| Solid Butyl Rubber | |
| Optional Non-Solid Butyl Oligomeric Butyl Rubber Component | 0% to 6% |
| Resin Component, High Molecular Weight Polyvinyl Acetate | 15% to 45% |
| Compatibilization Component High Melting Point Wax | 15% to 32% |
| Texturizing Component | |
| Vegetable Oil | 12% to 25% |
| Softener | 2% to 6% |
| Filler | 5% to 14% |
| Emulsifier/Anti-oxidant | — |

In the case of the above formulation, it has been found that the solid butyl rubber can be raised to the desired temperature at which point portions of the high melting point wax can be added under mild mixing conditions with for example, a sigma blade mixer at low rpm's until different levels of consistency are attained after each addition.

Optionally, the non-solid butyl rubber oligomeric material can be added which has been found to particularly enhance the preparation of the elastomeric component. Once an essentially homogeneous plastic mass has been attained, the resin component can then be added also in a step-wise manner followed by addition of the texturizing component in increments of, for example, the filler material, followed by a vegetable oil, and softeners such as triacetin and finally the emulsifiers and/or anti-oxidants. In general, it has been found that once the elastomeric component has been heated to the desired temperature for mastication, the additional ingredients can be added in by order of decreasing melting points.

This can be compared to the conventional gum base which requires masterbatching the rubber at 150° to 180° C. during which time the rosin esters should be used to solubilize the rubber to the degree necessary to incorporate lower melting point components. Additionally, as a unexpected attribute of the gum base formed in accordance with the present invention, the process for making the overall composition can be continued without the need for cooling or otherwise aging the base material. Thus, a continuous process could be employed in order to effect formulation of a chewing gum composition.

SPECIFIC EXAMPLES OF THE INVENTION

EXAMPLE 1

A specific chewing gum base formulation was prepared in accordance with the composition set forth in Table III.

TABLE III

| Gum Base Ingredient | % By Weight Of Gum Base |
| --- | --- |
| Elastomeric Component | 5.70 |
| Solid Butyl Rubber | |
| Non-solid Butyl Rubber Oligomeric Material | 3.40 |
| Compatibilization Component High Melting Point Microcrystalline Wax | 22.00 |
| Resin Component High Molecular Weight Polyvinyl Acetate (greater than 20,000 MWU) | 35.00 |
| Texturizing Component | |
| Hard Palm Oil | 17.33 |
| Calcium Carbonate | 10.00 |
| Triacetin | 3.90 |
| Butyl Hydroxyanisol | 2.67 |
| | 100.00 |

The solid butyl rubber material was heated under pressure of approximately 30 pounds per square inch to a temperature of 220° C. to 250° C. and stirred with a sigma blade stirrer until the material reached a fine particulate consistency, e.g., sandy consistency. At this point approximately ¼ of the compatibilization component (high melting point microcrystalline wax) was added and stirred for 10 minutes after which a second portion of the wax was added and stirred. This procedure could be continued until all the wax material or compatibilization material is added, but it has been found that a particularly effective composition method includes the addition of a non-solid butyl rubber material under the low shear mixing conditions. This addition of the non-solid material such as an oligomeric butyl rubber material can be included as one of the steps for masticating the elastomeric material. In the present example, after two portions of about 25% each of the high melting point wax were added, the non-solid butyl rubber was added and stirred for about 15 minutes followed by addition of two more portions of about 25% each of the melting point wax, followed by 10 minutes of stirring per each addition. At this point the elastomeric material had achieved a substantially single homogeneous plastic mass, to which the resin, high molecular weight polyvinyl acetate, was added in increments of ⅓ each followed by stirring about five minutes after each incremental addition. Upon addition of the high molecular weight polyvinyl acetate the temperature of the overall mass is still at about 220° C., which, under the work generated by the sigma blade mixtures, can achieve temperatures in the range of about 270° C. Thus, as a result of the present invention it would be impossible to use softeners known in the art, such as glycerol triacetate, having a boiling temperature of about 258° C., since it would flash off under the mixing conditions of the present invention.

Once the elastomeric and resin gum base components have been compatibilized, a texturizing component which includes traditional gum base ingredients can then be added. In the present example, calcium carbonate was added and stirred for about 10 minutes followed by step-wise additions of the palm oil in increments of ⅓ portions of the overall amount followed by stirring for about five minutes for each portion. Finally, glycerol triacetate was added with five minutes of stirring followed by the addition of butyl hydroxyanisol and stirring of the overall composition for 20 minutes under a reduced temperature. The resulting gum base was a substantially single phase homogeneous mass which was easily composited into different commercial type chewing gum compositions.

EXAMPLE 2

A second chewing gum base was prepared in accordance with the composition shown in Table IV.

TABLE IV

| Gum Base Ingredient | % By Weight Of Gum Base |
|---|---|
| Butyl Rubber | 8.90 |
| Compatibilization Component High Melting Point Micro-Crystalline Wax | 15.00 |
| Resin Component High Molecular Weight Polyvinyl Acetate (greater than 20,000 MWU) | 40.00 |
| Texturizing Component | |
| Hard Palm Oil | 17.33 |
| Calcium Carbonate | 10.00 |
| Triacetin | 6.10 |
| Butyl Hydroxyanisol | 2.67 |
| | 100.00 |

As in the previous Example, the solid butyl rubber was heated under pressure of about 3 pounds per square inch to a temperature of from about 220° to about 250° C. followed by the step-wise addition of four approximately equal portions of a high melting point wax, each addition followed by 10 minutes of low shear stirring with a sigma blade mixer. Once a homogeneous plastic mass is achieved, polyvinyl acetate is added in three portions each portion followed by about five minutes of low shear stirring. Again, at this point a substantially single phase base material has been formed and to which a texturizing component which includes filler, vegetable oils, softeners and other ingredients can be added. In the present Example, calcium carbonate was then added followed by 10 minutes of stirring and the palm oil was added in ⅓ increments, each increment being stirred for five minutes each. Finally, the triacetin was added as a softener and stirred for five minutes before adding the butyl hydroxyanisol and overall stirring for 20 minutes. As before, the gum base of the present invention was a very smooth, good film-forming gum base material which can be used with either sugar-containing or sugarless chewing gum compositions.

EXAMPLE 3

In this Example, a peppermint chewing gum containing the gum base composition was prepared in accordance with the present invention so as to compare the attributes of the present gum base composition with a control chewing gum base made in accordance with the prior art so as to include wood rosin esters.

Inasmuch as peppermint is one of the least stable among gum flavors, the comparison is a good indicia of the improved shelf life stability of the gums of the present invention over those known in the art.

The ingredients of the respective chewing gums are set forth in Table V.

TABLE V

| Ingredients | Wt. (gm) |
|---|---|
| INVENTION | |
| Gum base without wood rosin esters | 106.0 |
| Sorbitol powder | 249.2 |
| Glycerin | 40.0 |
| Peppermint flavor | 4.8 |
| CONTROL | |
| Regular gum base (wood rosin esters) | 106.0 |
| Sorbitol powder | 249.2 |
| Glycerin | 40.0 |
| Peppermint flavor | 4.8 |

The chewing gum compositions were prepared using conventional mixing equipment. The sorbitol powder is first added to the mixing kettle which is mixed for approximately three (3) minutes in order to break up lumps. The gum base, heated to approximately 95° C. so as to be in a molten state, is added to the sorbitol powder and while mixing, the glycerin component is added. The composite was then mixed for an additional three (3) minutes. Finally, the peppermint flavorant oil is added and mixed for a final three minute period. The finished gum product was rolled and scored.

Both the control gum and that of the present invention were stored at 45° C. for three (3) weeks which would be approximately equivalent to a shelf storage of two (2) years at room temperature (approximately 20° C.).

The two gums were then subjected to a blind organoleptic survey evaluation by sixty (60) sensory expert panelists. Each individual was asked to subjectively rate the quality of each gum on a scale of 1 to 9; 9.0 being most liked and 1.0 being least liked. Three categories were judged: overall preference, flavor and texture. The results were tabulated and average mean values derived and set forth in Table VI.

TABLE VI

| | Overall Preference | Flavor Quality | Texture Quality |
|---|---|---|---|
| Invention (without rosins) | 7.5 | 6.4 | 6.1 |
| Control (with rosins) | 4.3 | 3.8 | 5.7 |

Referring to Table VI, the results of the organoleptic survey demonstrate the superiority of the present invention in all categories tested. Gum made in accordance with the present invention was given an overall preference rating of almost 75% higher (7.5 to 4.3), than the control gum made in accordance with the prior art. Further, the flavor quality rating of the gum made in accordance with the present invention was 68% higher, (6.4 to 3.8) than the control while the texture quality rating of the gum made in accordance with the present invention was 7% higher than the control. These results demonstrate a significant improvement in chewing gum product using the inventive chewing gum base.

The chewing gum of the present invention and the control formulation were also subjected to a thirty minute peppermint chew out evaluation. This test compares the percent by weight of the peppermint flavor contained in a gum sample to the amount of peppermint flavor which remains in the bolus after a thirty minute mastication period. The results are set forth in Table VII.

TABLE VII

| Formulation | Peppermint In Gum % By Wt | Peppermint Remaining in Bolus % by Wt | Percent Flavor Chew Out |
|---|---|---|---|
| Invention (without rosins in gum base) | 1.195 | 0.854 | 28.5 |
| Control (with rosins in gum base) | 1.182 | 1.090 | 7.8 |

The gum composition made in accordance with the novel gum base of the present invention is capable of retaining in the end product a higher percent by weight of the desired flavor. As Table VII shows, for example, by excluding rosins from the gum base, an approximately 1.1% (1.1.95 − 1.182 = 0.013 ÷ 1.182 × 100%) greater amount of peppermint was incorporated in the final gum product. Given the extreme potency of the flavor oils and small amounts used in gum products, a 1.0% percent increase in retained flavor is quite meaningful in terms of final product flavor release properties.

Referring to Table VII, an even greater enhancement in product quality is demonstrated. In particular, these results show that the gum sample made in accordance with the present invention provided a hefty 28.5% chew out of the peppermint flavor (1.195 − 0.854 = 0.341 ÷ 1.195 × 100%). The control gum, on the other hand, was only able to provide a meager 7.8% chew-out of the peppermint flavor (1.182 − 1.090 = 0.092 ÷ 1.182 × 100%). The results of a chew-out evaluation demonstrate an almost four-fold increase in peppermint flavor released by the chewing gum of the present invention when compared o the prior art as represented by the control.

Furthermore, the presence of wood rosin esters in gum subjects the flavors to interactions therewith, thereby prohibiting the free migration of flavors and of the gum during mastication. The elimination of the wood rosin esters eliminates this undesirable interaction and permits the flavor to be exuded during chewing. The results of the above tests clearly demonstrate the efficacy of the present invention in achieving this phenomenon.

The superior results achieved by the present invention convincingly show that it is now possible to compatibilize an elastomer and a resin in a chewing gum base composition without including undesirable and heretofore generally considered necessary ingredients. Also the chewing gums made in accordance with the gum bases of the present invention are preferable and offer superior organoleptic properties.

The ineluctable conclusion is that chewing gums made in accordance with the present invention exhibit accentuated flavor delivery throughout the chewing or mastication period. By eliminating the need for wood rosin esters and terpenes, the present invention allows for the compatibilization of both the elastomer and resin within the gum base while at the same time providing a chewing gum capable of providing a significantly increased amount of flavor released.

Upon review of the above description and specific Examples of the present invention, one skilled in the art will readily understand its applicability to other gum base compositions which normally require the use of wood rosin esters in general, and, in particular, ester gums as well as terpenes.

This invention may be embodied in other forms or carried out in other ways without departing from the spirit or essential characteristics thereof. The present disclosure is therefore to be considered as in all respects illustrative and not restrictive, the scope of the invention being indicated by the appended claims, and all changes which come within the meaning and range of the equivalency are intended to be embraced therein.

I claim:

1. A chewing gum base composition being substantially devoid of rosin esters and terpene components comprising:
    (a) an elastomer component selected from the group consisting of synthetic and natural rubber polymers; and mixtures thereof
    (b) a high melting point wax compatibilization component; and
    (c) a high molecular weight polymeric resin component.

2. The chewing gum base of claim 1 which further comprises a texturizing component selected from the group consisting of softeners, fillers, emulsifiers, and combinations thereof.

3. The chewing gum base of claim 1 wherein said elastomer is selected from the group consisting of styrene-butadiene copolymer, polyisobutylene, polyisoprene, isobutylene-isoprene copolymer and natural elastomers and combinations thereof.

4. The chewing gum base of claim 1 wherein said elastomer includes a first solid elastomer component, and a cold flow elastomer component added after said solid elastomer component has been masticated by use of said high melting point compatibilization component.

5. The chewing gum base of claim 4 wherein said high melting point wax is selected from the group consisting of microcrystalline wax, paraffin wax, and mixtures thereof.

6. The chewing gum base of claim 1 wherein the melting point of said high melting point compatibilization component is about 160° to about 215° F.

7. The chewing gum base of claim 1 wherein the melting point of said high melting point compatibilization component is about 175° to about 195° F.

8. The chewing gum base of claim 1 wherein said polymeric resin is selected from the group consisting of polyvinyl acetate, polyvinyl butylester, copolymers of vinyl esters and vinyl ethers, polyethylene, ethylene-vinyl acetate copolymers, vinyl acetate, vinyl alcohol copolymers, vinyl acetate-vinyl laurate copolymers, and combinations thereof.

9. The chewing gum base of claim 8 wherein said resin is a high molecular weight polyvinyl acetate having a molecular weight of at least about 20,000.

10. The chewing gum base of claim 2 wherein said softeners are selected from the group consisting of hydrogenated vegetable or animal fats, glycerol monostearate, lecithin, coconut oil, palm oil, fatty acids, glycerol triacetate, and acetylated monoglyceride and combinations thereof.

11. The chewing gum base of claim 2 wherein said fillers are selected from the group consisting of calcium carbonate, aluminum hydroxide, alumina, magnesium carbonate, dicalcium phosphate, talc, magnesium trisilicate, magnesium hydroxide, aluminum silicates, silica gel, organic fillers, and combinations thereof.

12. The chewing gum base of claim 2 wherein said emulsifiers are selected from the group consisting of glycerol monostearate, lecithin, cephalin, Tweens, Spans, and mixtures thereof.

13. The chewing gum base of claim 1 wherein said elastomer component is included in an amount of from about 5% to about 20% by weight of said base.

14. The chewing gum base of claim 1 wherein said elastomer component is included in an amount of from about 7% to about 15%.

15. The chewing gum base of claim 1 wherein said resin component is present in an amount of about 10% to about 50% by weight based on said gum base.

16. The chewing gum base of claim 1 wherein said resin component is present in an amount of about 25% to about 40% by weight based on said gum base.

17. The chewing gum base of claim 1 wherein said high melting point wax compatibilization component is present in an amount of from about 15% to about 55% by weight of said base.

18. The chewing gum base of claim 1 wherein said high melting point compatibilization component is present in an amount of about 28% to about 45% by weight of said base.

19. The chewing gum base of claim 2 wherein said texturizing component is included in an amount of about 10% to about 35% by weight of said base.

20. The chewing gum base of claim 2 wherein said texturizing component is included in an amount of about 12% to about 24% by weight of said base.

21. A chewing gum composition prepared with a chewing gum base composition prepared in accordance with the formula set forth in claim 1.

22. A modified elastomer composition useful in a chewing gum composition and being substantially devoid of rosin esters and terpene components comprising an elastomer component selected from the group consisting of synthetic and natural rubber polymers and mixtures thereof and a high melting point wax compatibilization component having a melting point of about 130° F. (54° C.) to about 250° F. (121° C.), said wax compatibilization component being capable of effecting dissociation of said elastomers under conditions of temperature and low shear mixing sufficient to form a substantially homogenous mass.

23. The modified elastomer component of claim 22 wherein said wax is selected from the group consisting of microcrystalline wax, paraffin wax and mixtures thereof.

* * * * *